(12) United States Patent
Secilmis et al.

(10) Patent No.: US 12,423,446 B2
(45) Date of Patent: Sep. 23, 2025

(54) INTEGRATED CRYPTOGRAPHIC CIRCUITS IN SPACE APPLICATIONS

(71) Applicant: Tethers Unlimited, Inc., Bothell, WA (US)

(72) Inventors: Seckin Kemal Secilmis, Bothell, WA (US); Brad Mahlen, Bothell, WA (US); Dylan Del Castillo, Bothell, WA (US); Nat Zhurakovskyy, Bothell, WA (US); Jesse Cirillo, Bothell, WA (US)

(73) Assignee: Tethers Unlimited, Inc., Bothell, WA (US)

( * ) Notice: Subject to any disclaimer, the term of this patent is extended or adjusted under 35 U.S.C. 154(b) by 428 days.

(21) Appl. No.: 17/549,752

(22) Filed: Dec. 13, 2021

(65) Prior Publication Data

US 2022/0188428 A1     Jun. 16, 2022

Related U.S. Application Data

(60) Provisional application No. 63/124,600, filed on Dec. 11, 2020.

(51) Int. Cl.
*G06F 21/60* (2013.01)
*G06F 11/30* (2006.01)
(Continued)

(52) U.S. Cl.
CPC ........ *G06F 21/602* (2013.01); *G06F 11/3058* (2013.01); *G06F 21/72* (2013.01); *G06F 21/82* (2013.01); *G06F 21/107* (2023.08)

(58) Field of Classification Search
CPC .................................................. G06F 21/602
See application file for complete search history.

(56) References Cited

U.S. PATENT DOCUMENTS

| 6,702,457 | B1 * | 3/2004 | Smith | .................... | G01K 3/005 |
| | | | | | 361/103 |
| 7,392,399 | B2 | 6/2008 | Grohoski et al. | | |

(Continued)

FOREIGN PATENT DOCUMENTS

| EP | 1435716 | 7/2004 |
| EP | 1953954 | 8/2008 |

(Continued)

OTHER PUBLICATIONS

International Search Report and Written Opinion in International Appln. No. PCT/US2021/063134, dated Apr. 4, 2022, 13 pages.

*Primary Examiner* — Simon P Kanaan
(74) *Attorney, Agent, or Firm* — Fish & Richardson P.C.

(57) ABSTRACT

Cryptographic integrated circuits include an input module configured to receive a stream of input data packets, a plurality of cryptographic modules coupled to the input module, where each cryptographic module includes an input port for receiving an input data packet and an output port for transmitting an output data packet, and is configured to encrypt or decrypt the received input data packet to generate an output data packet, and an output module configured to receive output data packets from the plurality of cryptographic modules and to generate an output data stream comprising the output data packets, where the input and output modules and the plurality of cryptographic modules are mounted on a single integrated circuit board, and wherein the input module is configured to distribute the input data packets among the plurality of cryptographic modules.

29 Claims, 4 Drawing Sheets

(51) Int. Cl.
  *G06F 21/72* (2013.01)
  *G06F 21/82* (2013.01)
  *G06F 21/10* (2013.01)

(56) References Cited

U.S. PATENT DOCUMENTS

| | | |
|---|---|---|
| 2004/0039928 A1 | 2/2004 | Elbe et al. |
| 2004/0230813 A1 | 11/2004 | Check et al. |
| 2008/0297065 A1* | 12/2008 | Mubaslat ............ H05B 39/105 315/291 |
| 2009/0140861 A1* | 6/2009 | Caliri .................. G06Q 10/087 340/572.1 |
| 2011/0156799 A1* | 6/2011 | Zanardi ................ G01K 13/00 327/512 |
| 2017/0118180 A1 | 4/2017 | Takahashi |
| 2021/0110064 A1 | 4/2021 | Ibrahim et al. |

FOREIGN PATENT DOCUMENTS

| | | |
|---|---|---|
| WO | WO 1999014881 | 3/1999 |
| WO | WO 2021032946 | 2/2021 |

* cited by examiner

INTEGRATED CRYPTOGRAPHIC CIRCUITS IN SPACE APPLICATIONS

CROSS-REFERENCE TO RELATED APPLICATIONS

This application claims priority to U.S. Provisional Patent Application No. 63/124,600, filed on Dec. 11, 2020, the entire contents of which are incorporated herein by reference.

TECHNICAL FIELD

This disclosure relates to integrated circuits and methods for processing data streams.

BACKGROUND

Vehicles in space send and receive sensitive data to other vehicles such as satellites and to ground-based stations. To prevent interference with, and theft of, the transmitted data, the data can be encrypted.

SUMMARY

Data transmission to and from vehicles in space is frequently encrypted to ensure that the data cannot be read by, modified by, or stolen by, third parties who do not have permission to access the data. The integrated circuits and methods for processing data streams that are described herein permit data streams to be partitioned among multiple cryptographic processing modules for parallel encryption or decryption processing. For example, to encrypt a data stream, the data stream is first partitioned into individual packets. Headers are applied to the packets to allow routing of the packets to particular cryptographic processing modules for encryption. After the packets have been encrypted, they are re-assembled into an encrypted data stream for transmission. Similar partitioning techniques can be used for decryption processing of an incoming data stream.

Integrated circuits with multiple cryptographic processing modules allow an incoming or outgoing data stream to be partitioned into multiple packets, which can result in higher data throughput than could otherwise be achieved with a single cryptographic processing module. Further, the multiple modules provide redundancy in an integrated circuit, ensuring that if one module fails, the integrated circuit can continue to encrypt and/or decrypt data streams using the remaining cryptographic modules. In addition, each of the cryptographic modules in an integrated cryptographic circuit can encrypt and/or decrypt data packets using a different encryption key, allowing for individual cryptographic processing modules to be re-keyed periodically, and permitting data streams to be encrypted using multiple keys, which may provide enhanced security relative to data streams encrypted using a single key. When installed in a space vehicle, power consumption by an integrated circuit with multiple cryptographic processing modules can be controlled by selectively activating or de-activating certain modules, which permits active power management on the space vehicle.

In an aspect, the disclosure features cryptographic integrated circuits that include an input module configured to receive a stream of input data packets, a plurality of cryptographic modules coupled to the input module, where each cryptographic module includes an input port for receiving an input data packet and an output port for transmitting an output data packet, and is configured to encrypt or decrypt the received input data packet to generate an output data packet, and an output module configured to receive output data packets from the plurality of cryptographic modules and to generate an output data stream comprising the output data packets, where the input and output modules and the plurality of cryptographic modules are mounted on a single integrated circuit board, and where the input module is configured to distribute the input data packets among the plurality of cryptographic modules.

Embodiments of the circuits can include any one or more of the following features.

The plurality of cryptographic modules can include 2 or more (e.g., 4 or more) cryptographic modules. Each of the plurality of cryptographic modules can be configured with an encryption key to encrypt or decrypt the received input data packet. Each of the plurality of cryptographic modules can be configured with a common encryption key.

A first group of the plurality of cryptographic modules can be configured with a first encryption key, and a second group of the plurality of cryptographic modules can be configured with a second encryption key different from the first encryption key. Each of the plurality of cryptographic modules can be configured with a different encryption key.

The input module can be configured to replace a header of each input data packet with an encryption header that includes a designation of one of the plurality of cryptographic modules to which the input data packet is distributed by the input module. The output module can be configured to replace an encryption header of each output data packet with an output header.

Embodiments of the circuits can also include any of the other features described herein, including any combinations individual features described in connection with the same or different embodiments, except as expressly stated otherwise.

In another aspect, the disclosure features cryptographic systems that include any of the cryptographic integrated circuits described herein, and an electronic processor coupled to the cryptographic integrated circuit, where the electronic processor is configured to selectively activate or de-activate a subset of the plurality of cryptographic modules to encrypt or decrypt data packets of the stream of input data packets using activated cryptographic modules of the cryptographic integrated circuit.

Embodiments of the systems can include any one or more of the following features.

The system can be connected to a power source of a space vehicle, and the electronic processor can be configured to measure an amount of power remaining in the power source, and to adjust the number of activated cryptographic modules used to encrypt or decrypt data packets of the stream of input data packets based on the amount of power remaining in the power source. The system can be coupled to a power source of a space vehicle, and the electronic processor can be configured to measure a power consumption rate of the space vehicle, and to adjust the number of activated cryptographic modules used to encrypt or decrypt data packets of the stream of input data packets based on the power consumption rate.

The electronic processor can be configured to determine a bandwidth of the stream of input data packets, and to adjust the number of activated cryptographic modules used to encrypt or decrypt data packets of the stream of input data packets so that a data throughput rate of the cryptographic integrated circuit is at least as large as the bandwidth of the stream of input data packets. The electronic processor can be configured to adjust the number of activated cryptographic modules used to encrypt or decrypt data packets of the stream of input data packets to a minimum number of activated cryptographic modules so that the data throughput rate of the cryptographic integrated circuit exceeds the bandwidth of the stream of input data packets.

The systems can include a temperature sensor coupled to the electronic processor, where the electronic processor is configured to measure a temperature of the cryptographic integrated circuit, and to adjust the number of activated cryptographic modules so that the measured temperature does not exceed a threshold temperature value. The systems can include a plurality of temperature sensors, where each temperature sensor of the plurality of temperature sensors contacts one of the plurality of cryptographic modules, where the electronic processor is configured to measure a temperature of each cryptographic integrated circuit, and to de-activate cryptographic modules for which the measured temperature exceeds a threshold temperature value.

At least one of the electronic processor and the input module can be configured to de-activate cryptographic modules of the plurality of cryptographic modules that have failed. The electronic processor can be configured to determine that a cryptographic module of the plurality of cryptographic modules has failed if the cryptographic module receives a input data packet and goes not generate an output data packet.

The electronic processor can be configured to measure an electrical property of a cryptographic module of the plurality of cryptographic modules, and to determine that the cryptographic module has failed if a value of the measured electrical property is outside an accepted range of values for the measured electrical property. The measured electrical property can include a resistance or impedance of the cryptographic module. The measured electrical property can include a voltage drop across the cryptographic module or a current through the cryptographic module.

The input module can be configured to distribute the input data packets among the plurality of cryptographic modules based on an availability of each of the plurality of cryptographic modules. Each cryptographic module of the plurality of cryptographic modules can be configured to transmit a signal to the input module to indicate an availability of the cryptographic module to receive an input data packet from the input module.

The input module can be configured to distribute the input data packets among the plurality of cryptographic modules based on a size of each input data packet.

The input module can be configured to distribute a first plurality of f input data packets among f different cryptographic modules in a first order of the modules according to sizes of the f input data packets, and the input module can be configured to distribute a second plurality of f input data packets among the f different cryptographic modules in a second order of the modules that is opposite to the first order of the modules. The input module can be configured to repeat these steps with additional pluralities of f input data packets.

The input module can be configured to distribute the input data packets among the plurality of cryptographic modules based on an accumulated data processing load for each of the plurality of cryptographic modules. The input module can be configured to distribute each successive input data packet to a cryptographic module among the plurality of cryptographic modules for which the accumulated data processing load is smallest.

The input module can be configured to distribute the input data packets among the plurality of cryptographic modules based on an encryption or decryption protocol associated with each input data packet. The input module can be configured to distribute input data packets associated with a first encryption protocol to a first subset of the plurality of cryptographic modules, and to distribute input data packets associated with a second encryption protocol different from the first encryption protocol to a second subset of the plurality of cryptographic modules that is different from the first subset.

Embodiments of the systems can also include any of the other features described herein, including any combinations individual features described in connection with the same or different embodiments, except as expressly stated otherwise.

Some embodiments described herein relate to a computer storage product with a nontransitory computer-readable medium (also can be referred to as a non-transitory processor-readable medium) having instructions or computer code thereon for performing various computer-implemented operations. The computer-readable medium (or processor-readable medium) is nontransitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

As used herein, the term "vehicle" refers to any device, system, satellite, space station, or other man-made, payload-carrying object that is present in space. A vehicle may be in stationary orbit around the earth, a moon, another planet, or around another celestial body or object. A vehicle may also be traveling to or from a destination in space, and not in orbit.

As used herein, the term "bandwidth" refers to the number of bits per second (or bytes per second, or more generally, the quantity of data per unit time) that are encoded in an electronic signal. The electronic processor and/or an input module of any of the circuits described herein can be configured to determine the bandwidth of a data stream by receiving information preceding the data stream, and/or by measuring arrival times of individual packets of the data stream and the number of bits contained in each packet, and calculating the bandwidth of the data stream.

As used herein, the term "data throughput rate" refers to the number of bits per second (or bytes per second, or more generally, the quantity of data per unit time) that can be processed by a system, a circuit, or a circuit element. That is, the data throughput rate refers to the sustained rate at which the system, circuit, or circuit element can receive input data and generate output data with no difference between the input and output data rates.

As used herein, a "header" is a set of data bits that accompanies a packet of data in a data stream. Typically, each packet contains a header, which consists of data bits that function to mark the packet of data and may contain information about the packet of data. Such information can include, but is not limited to, information about the packet's length, origin, destination, content, encoding scheme, and error checking information. In some cases, each packet in a data stream contains a header, and each header has a common length (i.e., a fixed number of data bits are allocated to the header). In other cases, packets in a data stream may have variable-length headers. Typically, the data contained in the header is separate from the packet data. In a packet consisting of a sequence of bits, some of which are data bits and some of which are header bits, the header bits can be at the end or beginning of a block of data bits, or between one or more blocks of data bits. The header can be a monolithic block of header bits, or can consist of multiple blocks of header bits within a packet.

As used herein, "activating" a module, component, or other element of a circuit refers to supplying operating power to the module, component, or other element, and executing any other functions necessary to bring the module, component, or other element to an operating state in which the module, component, or other element is ready to receive instructions and/or execute functions. Similarly, "deactivating" a module, component, or other element of a circuit refers to executing any functions necessary to bring a module, component, or other element to a state where the module, component, or element is not ready to receive instructions and/or execute functions. In some embodiments, "deactivating" a module, component, or other element can include interrupting the supply of power to that element.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Introduction

Figure 1:
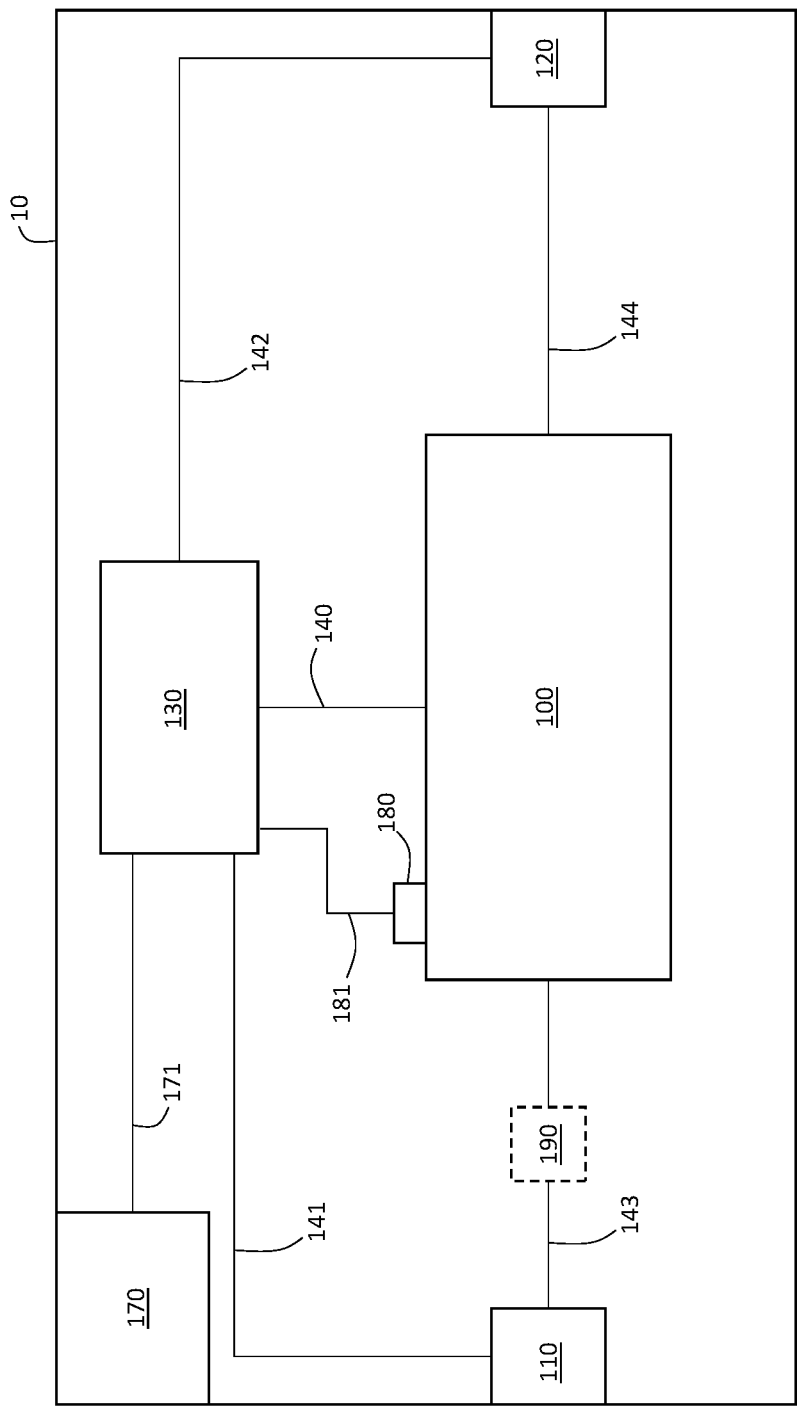
FIG. 1 is a schematic diagram showing an example of space vehicle with a cryptographic integrated circuit.

Conventional space vehicles such as satellites are large, with correspondingly large power supplies. Such vehicles are typically involved in complex communication and observation operations, gathering large amounts of data over a time period of years. Data transmitted to and from such space vehicles to ground stations is generally encrypted to ensure that data streams are not observed by, tampered with, or stolen by third parties that are not authorized to access the data.

To encrypt and decrypt data streams, conventional space vehicles can include cryptographic units. Such units typically stand alone and operate independently from one another, are typically relatively large, and thus consume significant quantities of power in operation. Where multiple units are present, data can be routed among the units using a stand-alone router that is also typically relatively large and consumes a significant amount of power. The router configuration is typically customized for each mission of a conventional space vehicle, and individual units may also be individually customized. As such, configuration of an entire on-board cryptographic system can be time-consuming.

For large space vehicles such as satellites, the power consumption, weight, and limited data processing bandwidth of conventional cryptographic units may not represent significant mission constraints. However, next generation space vehicles will be considerably smaller than conventional space vehicles, on account of advancements in spacecraft components such as optical elements, power systems, and batteries. On account of these developments, however, on-board power resources will therefore be much more limited, and weight constraints will be significantly more restrictive than for conventional space vehicles. These factors greatly limit the payload that can be supported by certain next generation space vehicles.

At the same time, next generation space vehicles are expected to generate and receive higher bandwidth data streams than those that are transmitted to and received from conventional space vehicles. As a result, cryptographic processing systems with bandwidths that are larger than conventional space vehicle-based cryptographic units will be needed to ensure that communications bottlenecks do not impair missions.

This disclosure features integrated cryptographic processing circuits, cryptographic processing systems, and data processing methods that can be used in next generation space vehicles to reduce power consumption and weight, and increase bandwidth, relative to conventional on-board cryptographic units. The circuits and systems generally include multiple Cryptographic Modules for Embedded Integration (CMEIs). By using multiple CMEIs, the overall data processing bandwidth of a circuit or system can be increased beyond the bandwidth of a single CMEI, allowing high bandwidth data streams to be processed.

A CMEI is an integrated circuit module that includes at least one data input port or line for receiving inbound data packets and at least one data output port or line for transmitting outbound data packets. The module also includes a terminal for connection to a system power bus or power control line from which the module receives operating power. The module encrypts or decrypts incoming data packets according to an encryption key, which can be delivered to the module on the data input port or line (or on another input port or line) from an electronic processor. The module can include an onboard random access memory for storage of the encryption key. The module can be re-keyed by delivery of a new encryption key from the electronic processor, allowing for reconfiguration of the module with a new encryption key on demand. Suitable CMEIs for use in the systems and circuits herein include the PROTEUS crypto module (available from Raytheon Technologies (Waltham, MA).

Examples of suitable CMEIs and their functionalities are described for example in U.S. Pat. No. 7,392,399, in U.S. Patent Application Publication Nos. US 2004/0039928, US 2004/0230813, and US 2021/0110064, and in PCT Patent Application Publication Nos. WO 1999/014881 and WO 2021/032946, the entire contents of each of which are incorporated herein by reference.

Integrated Cryptographic Circuits and Processing Systems

FIG. 1 is a schematic diagram showing a space vehicle 10 with an integrated cryptographic processing circuit 100. Space vehicle 10 also includes a data receiving unit 110, a data transmission unit 120, and an electronic processor 130. In general, data receiving unit 110 can be any type of communications device configured to receive data (e.g., as an incoming data stream) wirelessly from a data source. Similarly, data transmission unit 120 can be any type of communications device configured to transmit data (e.g., as an outgoing data stream) wirelessly to a data receive. Typically, both data receiving unit 110 and data transmission unit 120 are implemented as radios, i.e., a radio receiver and a radio transmitter, respectively. In some embodiments, a single transceiver (e.g., a radio transceiver) combines the functionality of data receiving unit 110 and data transmission unit 120 into a single component.

FIG. 1 shows a single electronic processor 130. More generally, however, electronic processor 130 can be implemented as a single processor, or as multiple processors performing separate and/or common control functions. The description below refers to a single electronic processor 130. However, it should be understood that the control functions described herein can be distributed among more than one electronic processor, and space vehicle 10 can include multiple electronic processors that collectively perform the various functions described.

As shown in FIG. 1, electronic processor 130 is connected to integrated cryptographic processing circuit 100 via one or more control lines 140. Control line(s) 140 allow electronic processor 130 to transmit control instructions, data, and operating power to cryptographic processing circuit 100, and to receive data from circuit 100.

Electronic processor 130 is connected to data receiving unit 110 via one or more control lines 141. Electronic processor 130 can receive data from a data source directly through data receiving unit 110. Such data can include, for example, encryption keys, information about incoming data streams, and a wide variety of other mission information that is not related to the processing of data streams.

Electronic processor 130 is connected to data transmission unit 120 via one or more control lines 142. Electronic processor can transmit data to a data receiver directly through data transmission unit 120. Such data can include, for example, information about outgoing data streams, and a wide variety of other vehicle and/or mission information that is not related to the processing of data streams.

In FIG. 1, electronic processor 130 is separate from cryptographic processing circuit 100, i.e., is connected to cryptographic processing circuit 100 via one or more control lines 140. In the following discussion, this general structure is referenced for clarity. However, it should be appreciated that in some embodiments, electronic processor 130 (and any of the components to which processor 130 is connected, as described herein) can be part of cryptographic processing circuit 100, and can, in some embodiments, be integrated onto a circuit board with some or all of the other components of cryptographic processing circuit 100. Moreover, when electronic processor 130 is part of cryptographic processing circuit 100, electronic processor 130 can be connected to one or more additional processors and/or components of space vehicle 10 via suitable control lines, and can receive and transmit information, data, and instructions to those additional processors and/or components.

Integrated cryptographic processing circuit 100 is connected to data receiving unit 110 via one or more data lines 143, and to data transmission unit 120 via one or more data lines 144. In general, incoming data streams received by data receiving unit 110 can be routed directly to circuit 100 for processing via data line(s) 143, and outgoing data streams processed by circuit 100 can be routed directly to data transmission unit 120 via data line(s) 144. Incoming and outgoing data streams can optionally be routed through electronic processor 130 via control line(s) 140 in addition to, or as an alternative to, direct routing to and from circuit 100, provided that the bandwidth afforded by electronic processor 130 and control line(s) 140 is sufficient.

Figure 2:
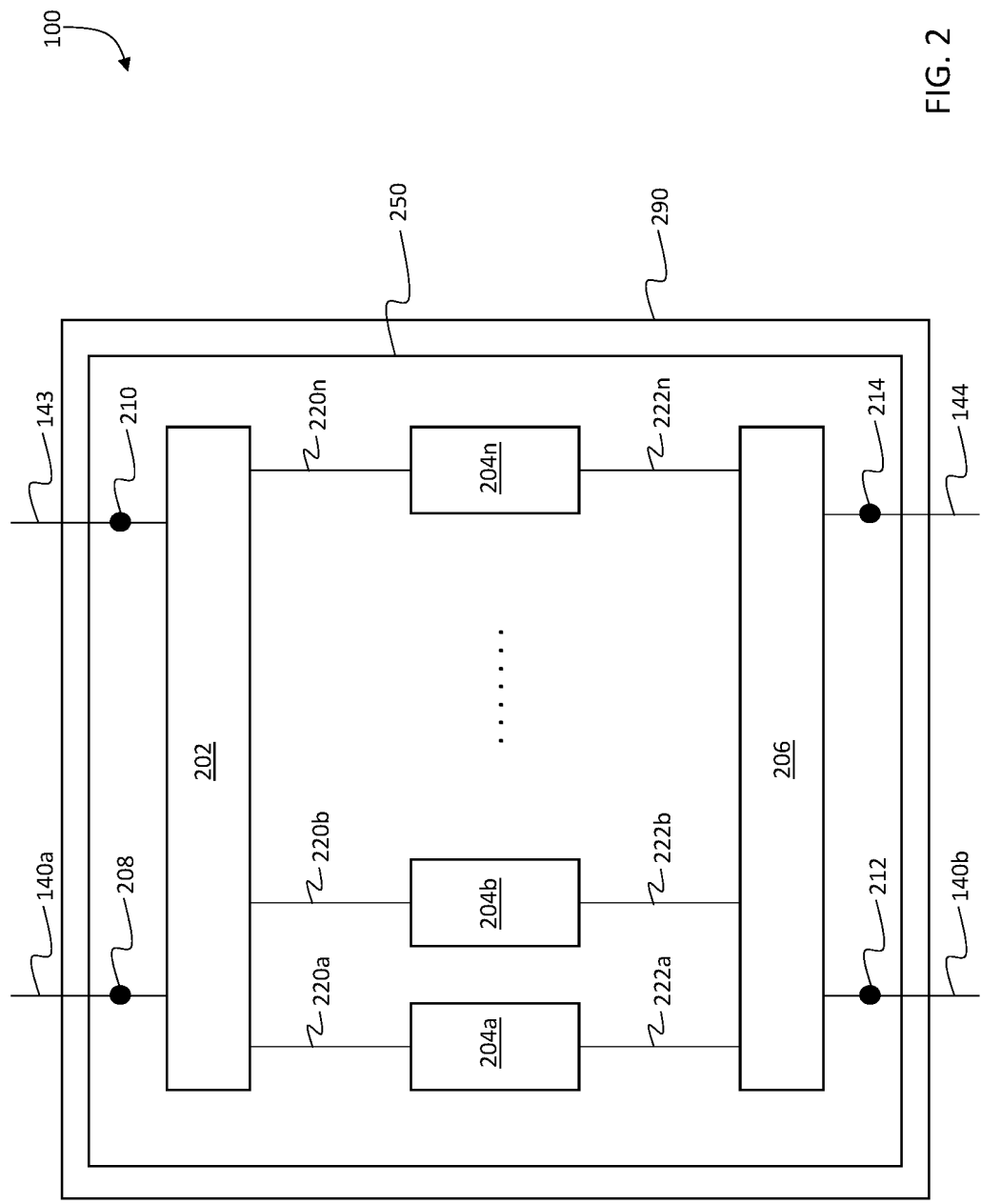
FIG. 2 is a schematic diagram showing an example of a cryptographic integrated circuit.

FIG. 2 is a schematic diagram of an example of an integrated cryptographic processing circuit 100. Circuit 100 includes input ports 208 and 210 connected to electronic processor 130 (via a control line 140*a*) and data receiving unit 110 (via data line 143), respectively. Circuit 100 also includes output ports 212 and 214 connected to electronic processor 130 (via a control line 140*b*) and data transmission unit 120 (via data line 144), respectively.

Input ports 208 and 210 are connected to input module 202, which performs input processing functions described in more detail subsequently. Input module 202 is connected to multiple CMEIs 204*a*-204*n*, which perform data encryption and/or decryption functions, via data lines 220*a*-220*n*. CMEIs 204*a*-204*n* are connected to output module 206 via data lines 222*a*-222*n*, which performs output processing functions described in more detail subsequently.

Circuit 100 can operate in either encryption mode or decryption mode, depending upon the input data stream. If the input data stream is to be encrypted, then CMEIs 204a-204n encrypt packets of the data stream according to individual encryption keys provided to the CMEIs from processor 130, either through input module 202 or directly via control lines that connect the CMEIs to processor 130. If the input data stream is to be decrypted, then CMEIs 204a-204n decrypt packets of the data stream according to individual encryption keys provided to the CMEIs from processor 130, either through input module 202 or directly via control lines.

For an incoming data stream that is to be decrypted, the incoming data stream can arrive from multiple components and/or sources. For example, in some embodiments, the incoming data stream arrives from data receiving unit 110 via data line(s) 143. In certain embodiments, the incoming data stream can arrive from processor 130 via control line(s) 140 and/or from one or more other components of vehicle 10 via additional control or data lines not shown in FIG. 1. Once decrypted, the outgoing data stream can be delivered to data transmission unit 120 via data line(s) 144. Alternatively, or in addition, the outgoing data stream can be delivered to processor 130 (e.g., via control line(s) 140) and/or to other components of vehicle 10.

For an incoming data stream that is to be encrypted, the incoming data stream can arrive from multiple components and/or sources. For example, in some embodiments, the incoming data stream arrives from data receiving unit 110 via data line(s) 143. In certain embodiments, the incoming data stream can arrive from processor 130 via control line(s) 140. In some embodiments, the incoming data stream can arrive from one or more other components of vehicle 10 via additional control or data lines not shown in FIG. 1. Once encrypted, the outgoing data stream can be delivered to data transmission unit 120 via data line(s) 144. Alternatively, or in addition, the outgoing data stream can be delivered to processor 130 (e.g., via control line(s) 140) and/or to other components of vehicle 10.

As shown in FIG. 2, circuit 100 is generally implemented as a single integrated circuit with one or more input ports and one or more output ports. The components of circuit 100 can be mounted on an optional single integrated circuit board 250, or on a combination of multiple circuit boards that are linked together via a common system communication and/or power backplane. In some embodiments, the volume of circuit 100 is 300 $mm^3$ or less (e.g., 280 $mm^3$ or less, 250 $mm^3$ or less, 220 $mm^3$ or less, 200 $mm^3$ or less, 180 $mm^3$ or less, 150 $mm^3$ or less, or even less). In certain embodiments, the area of circuit 100 (i.e., the total area of the circuit board(s) on which the components of circuit 100 are mounted) is 100 $mm^2$ or less (e.g., 90 $mm^2$ or less, 80 $mm^2$ or less, 70 $mm^2$ or less, 60 $mm^2$ or less, 50 $mm^2$ or less, 40 $mm^2$ or less, or even less). In some embodiments, the weight of circuit 100 is 50 g or less (e.g., 40 g or less, 30 g or less, 20 g or less, 10 g or less, or even less).

As shown in FIG. 2, circuit 100 can generally include any number of CMEIs. For example, the number of CMEIs (n in FIG. 2) can be 2 or more (e.g., 3 or more, 4 or more, 5 or more, 6 or more, 8 or more, 10 or more, 12 or more, 15 or more, 20 or more, or even more). In general, as the number of CMEIs used to encrypt or decrypt a data stream increases, the overall data processing bandwidth of circuit 100 increases, and the power consumption of circuit 100 also increases. In some embodiments, while circuit 100 includes n CMEIs, only a fraction p of the total number of CMEIs are used encrypt or decrypt a data stream. For example, p can be 0.9 or less (e.g., 0.8 or less, 0.7 or less, 0.6 or less, 0.5 or less, 0.4 or less, 0.3 or less, 0.2 or less, or even less).

In some embodiments, the data processing bandwidth provided by circuit 100 (e.g., the total number of bytes of input data that can be encrypted or decrypted per unit time) is 100 MB/s or more (e.g., 200 MB/s or more, 300 MB/s or more, 400 MB/s or more, 500 MB/s or more, 700 MB/s or more, 900 MB/s or more, 1 GB/s or more, 2 GB/s or more, 5 GB/s or more, 10 GB/s or more, or even more).

Figure 3:
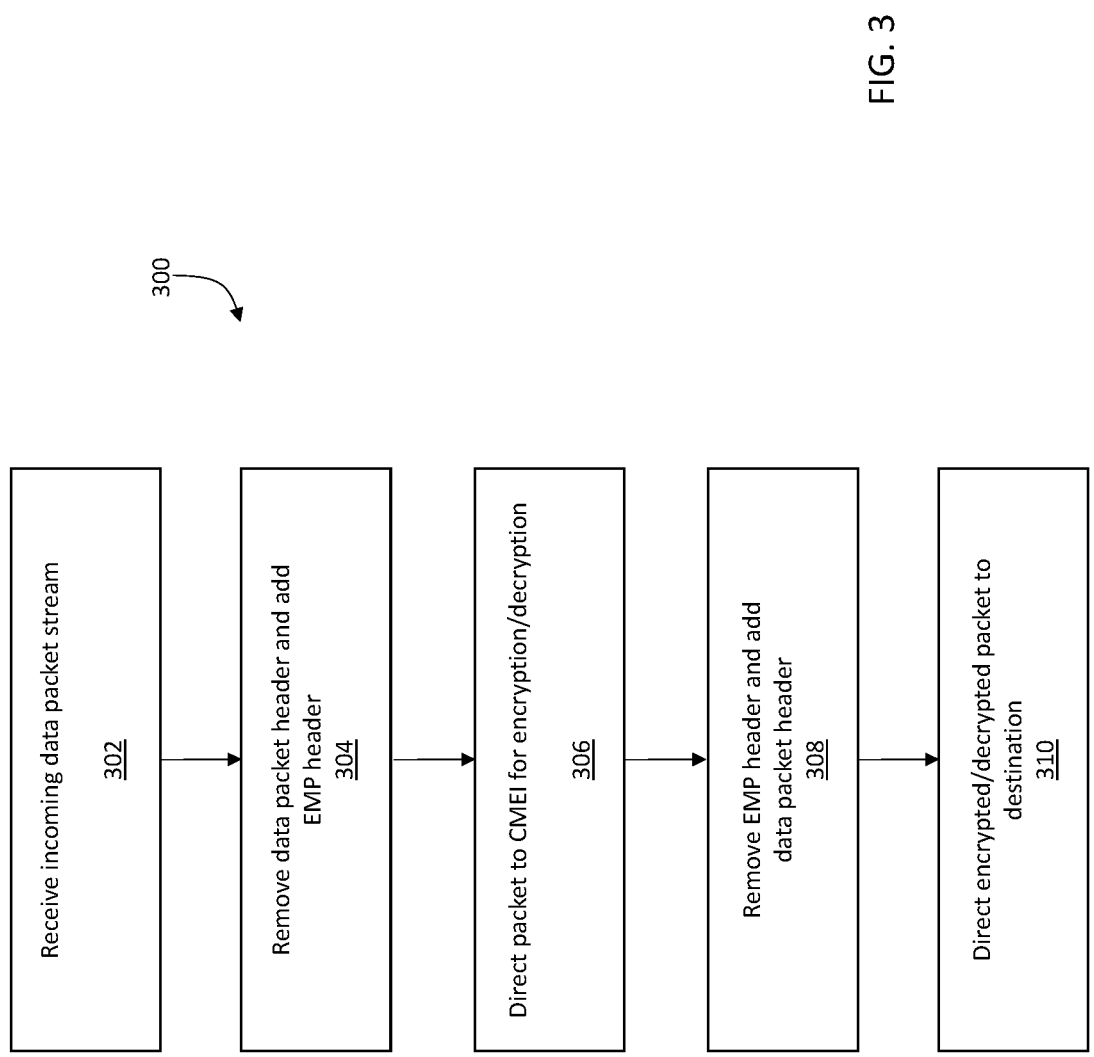
FIG. 3 is a flow chart showing a series of example steps for processing an incoming stream of data packets to generate an outgoing stream of encrypted or decrypted data packets.

In circuit 100, encryption and decryption of data packets are handled by the CMEIs, while input module 202 and output module 206 perform packet manipulation and routing operations. FIG. 3 is a flow chart showing a series of example steps that are performed by circuit 100 to process an incoming data stream. In step 302, the incoming data stream is received by input module 202 in the form of discrete data packets. In general, the data packets can be encoded according to any protocol, including, but not limited to, standard internet data transport protocols. Input module 202 processes each incoming data packet in step 304 by removing the data packet's header, and replacing the header with an Encryption Module Protocol (EMP) header.

Stripping the header can be accomplished in various ways. For example, in some embodiments, the header is a constant-length sequence that is located at an expected location and/or contains a particular identifier bit sequence. Input module 202 recognizes either or both of the header location in the packet sequence and/or the identifier bit sequence, and identifies the header sequence. Input module 202 then generates a modified data packet from which the bits corresponding to the header sequence have been removed.

In general, the EMP header sequence can contain a variety of information including, but not limited to, information about the length of the data sequence in a packet, information about the encoding method and/or encryption method for data contained in the packet, information about the format of data bits in the packet, and information about error checking bits and other non-data bits in the packet. Input module 202 can also be configured to include information in the EMP header specifying which CMEI will process the packet. As discussed further below, input module 202 can determine which CMEI will process each packet according to a variety of different criteria.

Next, in step 306, input module 202 directs the packet to the correct CMEI for encryption or decryption, based on the information in the packet's EMP header. Following encryption or decryption, the encrypted or decrypted packet is received by output module 206.

In step 308, output module 206 strips the EMP header from the packet and adds a new data packet header. The new data packet header can generally include any of the information contained in the data packet header from the incoming data stream. Further, the data packet header can include information about the encryption method used to encrypt the packet (for an outgoing encrypted data stream) and key related information (e.g., key or key-set identity, bit depth) for downstream decoding of individual packets. This information can be added by output module 206, communicating with CMEIs 204a-204n to determine the encryption and key-related information used to encrypt/decrypt each packet.

Next, in step 310, output module 206 directs the encrypted or decrypted packet to its destination. As described above in connection with input module 202, output module 206 processes encrypted or decrypted data packets as they are received from the CMEIs of circuit 100. A data receiver, such as a ground station or communications device of another space vehicle, processor 130, or another component of vehicle 10, that receives the data packets reassembles the data packets into a data stream according to a data transport protocol or application layer protocol.

Because all packet routing, encryption/decryption, and distribution functions are performed by a single integrated circuit, the power consumption of circuit 100 is typically much lower than conventional on-board cryptographic systems. In some embodiments, for example, the power consumption of circuit 100 during operation is 1 mW or less (e.g., 700 μW or less, 500 μW or less, 300 μW or less, 200 μW or less, 100 μW or less, 50 μW or less, 30 μW or less, 10 μW or less, 5 μW or less, 3 μW or less, 1 μW or less, or even less).

As described above, circuit 100 performs integrated routing, encryption/decryption, and post-processing distribution in a single integrated circuit that can be implemented on a single integrated circuit board with a relatively small form factor. Circuit 100 replaces the functionality of conventional packet routers and cryptography modules which occupy significantly more volume, weigh significantly more, and consume significantly more power.

Data packets can be multiplexed to input module 202 to the CMEIs according to various criteria. In some embodiments, input module 202 simply distributes incoming data packets to CMEIs 204a-204n in sequential order. Each successive data packet is routed to the next CMEI in a fixed ordering scheme. In general, for this packet routing procedure, higher overall data processing bandwidth is achieved by circuit 100 when the incoming data packets are of equal length or similar length (e.g., differ in the number of data bits by 10% or less).

In some embodiments, input module 202 distributes incoming data packets according to the availability of CMEIs 204a-204n. In this packet routing procedure, each CMEI transmits to input module 202 a signal indicating that it is ready to receive a new data packet for processing. Input module 202 distributes each successive incoming data packet to the next available CMEI, based on receipt of signals from the CMEIs. In this manner, latency among the CMEIs is reduced in the event that data packet processing among the CMEIs does not occur perfectly synchronously. Instead, incoming data packets can be processed asynchronously while still maintaining high data processing bandwidth. In general, for a data stream that includes variable length data packets, data packets that—according to their content—are processed at different throughput rates, or data packets that are received intermittently, it can be possible to achieve higher overall data throughput rates (i.e., encryption or decryption throughput rates) by distributing the incoming packets according to the availability of CMEIs 204a-204n.

In certain embodiments, input module 202 distributes incoming data packets according to packet size. For example, when an incoming data stream includes packets of different size, the packets can be distributed by input module 202 to CMEIs 204a-204n to balance the processing load on the CMEIs. Consider the following example, which three CMEIs 204a-204c are present in circuit 100. Input module 202 receives three incoming data packets of sizes $S_1$-$S_3$, where "size" refers to the number of data bits in each packet, and $S_1 > S_2 > S_3$. Input module 202 distributes the packet of size $S_1$ to CMEI 204a, size $S_2$ to CMEI 204b, and size $S_3$ to CMEI 204c.

The next three packets that are received by input module 202 have sizes $S_4$, $S_5$, and $S_6$, respectively, where $S_4 > S_5 > S_6$. Input module 202 distributes these packets in reverse order, to CMEIs 204c, 204b, and 204a, respectively. In this manner, input module 202 at least partially balances the processing load assigned to CMEIs 204a-204c.

The foregoing protocol can be applied to a group of f CMEIs in circuit 100, where f is between 2 and n (i.e., the total number of CMEIs in circuit 100). Upon receipt of each successive group of f data packets, input module 202 can distribute the packets among the f CMEIs in successive forward and reverse orderings, to at least partially balance the processing load among the CMEIs.

Alternatively, input module 202 maintain a record of packet sizes distributed to CMEIs in circuit 100, and can distribute successive, incoming variable size packets among CMEIs based on the total accumulated data processing load (i.e., the total accumulated size of all packets) assigned to each of the CMEIs. In other words, when each successive packet is received by input module 202, the module distributes the packet to the CMEI with the lowest accumulated total packet size, and then updates the total for that CMEI in its record.

In some embodiments, the CMEIs in circuit 100 can have different data throughput rates, and input module 202 can distribute incoming data packets among the CMEIs based on their respective data throughput rates. For example, if CMEI 204a has a data throughput rate that is twice as large as the data throughput rate of CMEI 204b, input module 202 can distribute twice as many incoming data packets to CMEI 204a as to CMEI 204b. More generally, for any two CMEI's in circuit 100, the ratio of the number of data packets distributed to the first CMEI relative to the second CMEI can be the ratio of their respective data throughput rates, within 20% or less (e.g., 15% or less, 10% or less, 5% or less) of the value of the ratio of their respective data throughput rates. Further, for f CMEIs in circuit 100, the relative numbers of data packets delivered to each of the f CMEIs can correspond to the relative data throughput rates of the f CMEIs, within 20% or less (e.g., 15% or less, 10% or less, 5% or less) of the value of the largest ratio of data throughput rates among any two of the f CMEIs. Thus, for example, for f=4 CMEIs with data throughput rates $R_1$, $R_2$, $R_3$ and $R_4$, with $R_1=R_2=3R_3=2 R_4$, the relative number of data packets distributed to each of the 4 CMEIs can be 3N, 3N, N, and 1.5N, respectively, where N is the total number of data packets distributed to the CMEI with the smallest data throughput rate, i.e., $R_3$ in this example.

In some embodiments, input module 202 can distribute incoming data packets to CMEIs of circuit 100 based on packet contents. For example, among the CMEIs in circuit 100, certain CMEIs may be configured to encrypt or decrypt packets in different ways, such as by using different encryption schemes, longer or stronger encryption keys, multi-factor encryption or decryption protocols, and more generally, different data processing methods. Headers on incoming data packets can provide information about data packet contents and the manner in which such packets should be processed. Alternatively, information about the manner in which incoming data packets should be processed can be provided to input module 202 by processor 130.

Incoming data packets can be routed to specific CMEIs by input module 202 according to the manner in which they should be encrypted or decrypted. For example, incoming packets designated for "stronger" encryption or decryption (e.g., using keys of different types and/or longer lengths) can be distributed to one subset of the CMEIs, and incoming packets designated for "weaker" encryption or decryption (e.g., using keys of alternative types and/or shorter lengths) can be distributed to another subset of the CMEIs. Multiple different encryption/decryption types and/or strengths can be represented among groups of CMEIs, and input processor 202 can direct incoming data packets accordingly.

In some embodiments, incoming data packets of different types can be routed to specific CMEIs by input module 202. For example, the headers of each packet in a data stream can include an identifier bit sequence corresponding to one of multiple different packet types. Input module 202 can then add an appropriate EMP header directing each individual packet to a particular CMEI (or one of several CMEIs) based on the packet's identifier bit sequence. The input module 202 then distributes the packets to the CMEIs accordingly.

Type-based routing of data packets can be used in many different circumstances. For example, in certain embodiments, packets corresponding to a first set of signal types such as communications or, more generally, higher priority signals can be routed to certain CMEIs (e.g., encrypted/decrypted based on stronger encryption keys and/or a first encryption/decryption method) while packets corresponding to a second set of signal types such as telemetry or, more generally, lower priority signals can be routed to other CMEIs (e.g., encrypted/decrypted based on weaker encryption keys and/or a second encryption/decryption method).

In general, the presence of multiple CMEIs in circuit 100 provides a measure of redundancy that ensures circuit 100 can continue to encrypt and/or decrypt data packets even if one or more of the CMEIs fail. Failure of a CMEI can be detected by circuit 100 when an input data packet is distributed to a particular CMEI, but an output data packet from the CMEI is not received by output module 206. A variety of criteria can be used to establish that a particular CMEI has failed. For example, in some embodiments, a particular CMEI is designated as failed by input module 202 and/or processor 130 if q successive input data packets (where q is one or more, two or more, three or more, five or more, seven or more, nine or more, 10 or more, 15 or more, 20 or more, or even more) are delivered to the CMEI, and no output data packets are received from the CMEI.

In certain embodiments, a particular CMEI is designated as failed if one or more electrical properties of the CMEI, as measured by input module 202, output module 206, and/or processor 130, has changed by more than a threshold amount. Measured changes in electrical properties that can be used to identify that a particular CMEI has failed include, but are not limited to, impedance, resistance, conductivity through the CMEI, current through the CMEI, and a voltage drop across the CMEI.

In some embodiments, a particular CMEI is designated as failed if a physical property of the CMEI, measured by input module 202, output module 206, and/or processor 130, has changed by more than a threshold amount. Measured changes in physical properties that can be used to identify that a particular CMEI has failed include, but are not limited to, temperature of the CMEI.

If input module 202, output module 206, and/or processor 130 determines that a CMEI has failed, input module 202 can cease distribution of incoming data packets to the CMEI. Data packets instead continue to be distributed to the other, non-failed CMEIs of circuit 100. Because circuit 100 includes multiple CMEIs, the failure of one CMEI, or even more than one CMEI, does not prevent circuit 100 from continuing to encrypt/decrypt data packets from an incoming data stream.

As noted above, input module 202 can cease distribution to one or more CMEIs in circuit 100 that have failed. In addition, one or more CMEIs in circuit 100 can be de-activated according to certain criteria. De-activation of a CMEI can be performed by input module 202 and/or by electronic processor 130, and is typically implemented when operating power to the CMEI is interrupted by a suitable control signal from input module 202 or processor 130.

CMEIs in circuit 100 can be de-activated for various reasons. As discussed above, the cryptographic integrated circuits described herein are designed for use in next generation space vehicles such as satellites with limited power availability. Accordingly, in some embodiments, CMEIs in circuit 100 can be de-activated to reduce power consumption and conserve available on-board power resources. Referring to FIG. 1, in some embodiments, vehicle 10 includes a power source (e.g., a battery or array of batteries) 170 connected by control line 171 to processor 130. Processor 130, via control line 171, can monitor the amount of power available in power source 170, and optionally, can measure/determine other power-related parameters such as a power consumption rate for vehicle 10. If the amount of power available falls below a certain threshold level and/or the power consumption rate rises above a certain threshold level, processor 130 can selectively de-activate one or more CMEIs in circuit 103, or deliver a suitable control signal to input module 202 so that input module 202 can de-activate one or more CMEIs in circuit 103. In certain embodiments, one or more thresholds can be established for the available power level and/or other parameters such as the power consumption rate, and as each threshold is crossed, one or more additional CMEIs can be de-activated to conserve additional power resources.

On the other hand, as available power in power source 170 increases and/or other parameters such as the power consumption rate for vehicle 10 change (i.e., the power consumption rate falls) such that the foregoing thresholds are crossed in the reverse direction, previously de-activated CMEIs can be re-activated by re-supplying power to the CMEIs. These re-activated CMEIs then rejoin the pool of CMEIs available to receive data packets from input module 202 for encryption/decryption.

Although the foregoing discussion has focused on circuit 100 either processing an incoming data stream for encryption or decryption, in some embodiments, certain CMEIs can be dedicated to decrypting incoming data packets and certain CMEIs can be dedicated to encrypting incoming data packets, such that circuit 100 performs both tasks at the same time. The incoming data stream can arrive from a single source, or can include data packets multiplexed from multiple sources, and there a mixture of data packets for encryption and for decryption. The header of each packet includes information that allows input module 202 to determine whether to direct each packet to a CMEI for decryption or encryption, in addition to the other header information discussed above.

In some embodiments, one or more CMEIs can be de-activated to ensure that failure does not occur due to elevated temperature. For example, vehicle 10 and/or circuit 100 can include a temperature sensor 180 connected to processor 130 by a control line 181. Processor 130 monitors the temperature measured by sensor 180. Typically, circuit 100 will be subject to significant temperature variations due to orbital cycle, and due to the processing of high-bandwidth data streams in a convection-less environment.

If the temperature of circuit 100 increases beyond a certain value, CMEIs and other components of circuit 100 are at risk of thermally-induced failure. To mitigate against this possibility, when the temperature measured by sensor 180 is above a threshold temperature value, processor 130 and/or input module 202 can selectively de-activate one or more (or even all) CMEIs to allow circuit 100 to cool down, and prevent failure of the CMEIs. When the temperature falls below the threshold level, one or more of the de-activated CMEIs can be re-activated and can rejoin the pool of CMEIs available to receive data packets for encryption/decryption.

In FIG. 1, a single temperature sensor 180 is present. In certain embodiments, multiple temperature sensors can be present. For example, temperature sensors can be attached to, or positioned in proximity to each of the CMEIs, or groups of multiple CMEIs. Where each CMEI has a dedicated temperature sensor, input module 202 and/or controller 130 can monitor the temperature of each CMEI, and can de-activate any CMEI for which the measured temperature exceeds a threshold value. Similarly, individual CMEIs for which the measured temperature reduces below the threshold value can be re-activated.

In some embodiments, controller 130 and/or input module 202 can selectively activate or de-activate CMEIs based on parameters of an incoming data stream. For example, the greater the bandwidth of an incoming data stream, the larger the number of CMEIs that can be activated to encrypt/decrypt the stream's data packets. Conversely, the smaller the bandwidth of an incoming data stream, the smaller the number of CMEIs that can be activated to encrypt/decrypt the stream's data packets. In certain embodiments, controller 130 can include stored calibration information representing the relationship between the number of CMEIs that are used for encryption/decryption in circuit 100, and the data throughput of circuit 100. Based on the bandwidth of the incoming data stream, controller 130 can determine an appropriate number of CMEIs to activate to encrypt/decrypt the incoming data stream, so that not all of the circuit's CMEIs are activated to process the data stream. In certain embodiments, controller 130 ensures that no additional CMEIs are activated beyond the required number to match the incoming data stream's bandwidth.

In some embodiments, vehicle 10 can include an optional data storage unit 190 into which an incoming data stream is directed. Data storage unit 190 can optionally store incoming data packets until they are encrypted/decrypted by circuit 100. As discussed above, in some embodiments, the data throughput rate of circuit 100 is the same as or exceeds the bandwidth of an incoming data stream. In these circumstances, the incoming data stream can be processed in real time to generate an outgoing data stream with no intermediate storage of the incoming data stream. However, depending upon the nature of the data in the incoming data stream and the data receiver to which the outgoing data stream will be directed, it may not be necessary to generate an outgoing data stream at the same bandwidth as the incoming data stream. Further, if the vehicle's power reserves are below the threshold discussed above and/or the power consumption rate exceeds the threshold discussed above, it may be advantageous to conserve power resources by reducing the overall power consumption of circuit 100.

In these circumstances, one or more of the CMEIs can be de-activated as described above. Doing so may reduce the data throughput rate of circuit 100 below the bandwidth of the incoming data stream. However, data storage unit 190 can operate as a data buffer, storing incoming data packets until they can be encrypted/decrypted by circuit 100 operating at the reduced data throughput rate. In certain embodiments, the number of CMEIs that remain activated in circuit 100 can be selected by processor 130 to match the data throughput rate of circuit 100 to a desired bandwidth of the outgoing data stream.

A particular advantage of circuit 100 is the circuit's flexibility with regard to encryption key management. In some embodiments, each of the CMEIs in circuit 100 can use the same encryption key or set of encryption keys. In certain embodiments, however, groups of CMEIs can use different encryption keys or key sets, and even each CMEI can have its own unique encryption key or key set. By processing data with multiple encryption keys, different packets of a data stream can be encrypted/decrypted to provide differing levels of security for different types of packets. For example, data packets corresponding to orbital and maneuvering control signals may be encrypted more strongly than data packets corresponding to more routine communications signals to ground stations.

Further, by encrypting/decrypting individual packets of data streams with multiple encryption keys, the data streams are made more secure. For a data stream that is encrypted with a single key, the overall security of the data stream is reduced to a single failure point. If an unauthorized third party obtains the encryption key, the entire data stream can be decrypted. Conversely, for a data stream in which individual packets are encrypted with different keys, if an unauthorized third party obtains one of the encryption keys, only some of the stream's data packets can be decrypted, and the entire data stream, in general, cannot be decrypted or reconstructed.

In addition, circuit 100 allows for the encryption keys used by the CMEIs to be changed as frequently as desired. Changing keys frequently provides another layer of security for data streams, as any unauthorized discovery or capture of an encryption key is rendered moot when the key is no longer used in circuit 100. As discussed above, processor 130 can distribute encryption keys to the CMEIs of circuit 100, either directly or through input module 202. The keys can be distributed sequentially to the CMEIs, or in parallel. In particular, parallel delivery of encryption keys to multiple CMEIs is an important advantage in many missions, where mid-mission re-keying is important for mission security.

In some embodiments, new encryption keys are delivered to some or all of the CMEIs of circuit 100 at periodic intervals. When new keys are delivered, all of the CMEIs can be re-keyed at the same time, or alternatively, only some of the CMEIs may receive new encryption keys at each re-keying event.

In certain embodiments, new encryption keys are delivered to some or all of the CMEIs in response to a particular event or circumstance. For example, new keys can be delivered when an outgoing data stream from vehicle 10 is partially or fully corrupted. As another example, new keys can be delivered when a security breach (e.g., one or more of the encryption keys used in circuit 100 is compromised) is detected or suspected. As a further example, new keys can be delivered when a third party is allowed communication access to the vehicle, to avoid providing existing encryption keys to the third party.

To provide additional protection for the components of circuit 100, the circuit can optionally be enclosed within a housing 290 that provides physical protection from space-borne debris. Housing 290 can be formed from various types of rigid materials including plastics and metals. In addition to physical protection, when housing 290 is formed from metals, housing 290 shields circuit 100 from electromagnetic radiation, mitigating damage to the components of circuit 100 that might otherwise occur from exposure to such radiation in an orbital environment.

Hardware and Software Implementations

Figure 4:
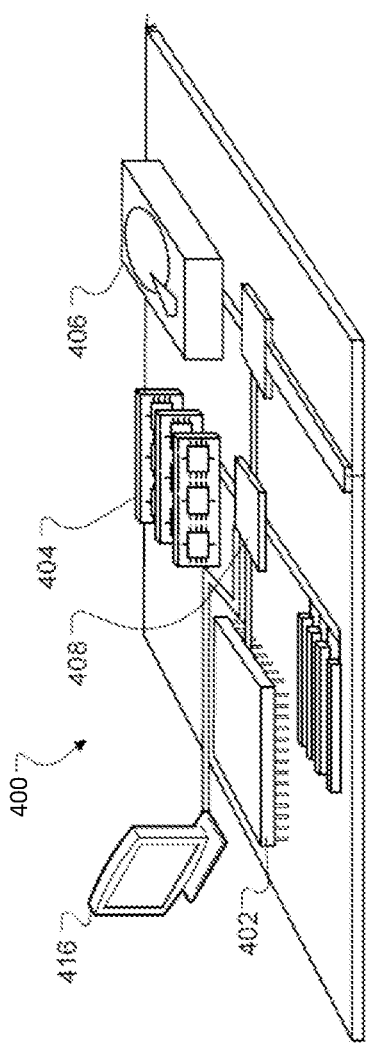
FIG. 4 is a schematic diagram of a computing system of a space vehicle.

In addition to the components shown in FIGS. 1 and 2, space vehicles and cryptographic systems can include additional components, either separate from circuit 100 (and connected to circuit 100 directly or indirectly through another component) or integrated into circuit 100. FIG. 4 is an example of a computing system 400, the components of which are present aboard vehicle 10 (and some or all of which may be integrated into circuit 100). System 400 includes one or more processors 402 (e.g., electronic processor 130), memory 404, a storage device 406 and interfaces 408 for interconnection. The processor(s) 402 can process instructions for execution within the controller, including instructions stored in the memory 404 or on the storage device 406. For example, the instructions can instruct the processor 402 to perform any of the analysis and control steps disclosed herein.

The memory 404 can store executable instructions for processor 402, information about parameters of the vehicle such as communications protocols, power consumption and availability information, component availability information, navigation instructions, and a wide variety of other calibration and operation settings and instructions. The storage device 406 can be a computer-readable medium, such as a floppy disk device, a hard disk device, an optical disk device, or a tape device, a flash memory or other similar solid state memory device, or an array of devices, including devices in a storage area network or other configurations. The storage device 406 can store instructions that can be executed by processor 402 described above, and any of the other information that can be stored by memory 404.

Any of the method steps described herein can be implemented by the components of system 400 (including processor 402 as electronic processor 130) executing instructions in one or more computer programs that are executable and/or interpretable by the processor. These computer programs (also known as programs, software, software applications or code) include machine instructions for a programmable processor, and can be implemented in a high-level procedural and/or object-oriented programming language, and/or in assembly/machine language. For example, computer programs can contain the instructions that can be stored in memory 404, in storage unit 406, and/or on a tangible, computer-readable medium, and executed by processor 402 as described above. As used herein, the term "computer-readable medium" refers to any computer program product, apparatus and/or device (e.g., magnetic discs, optical disks, memory, Programmable Logic Devices (PLDs), ASICs, and electronic circuitry) used to provide machine instructions and/or data to a programmable processor, including a machine-readable medium that receives machine instructions.

The modules of circuit 100 can also be implemented as described above. For example, input module 202 and/or output module 206, and any of cryptographic modules 204a-204n, can be implemented as a processor optionally connected to any of the other components above, and executing software instructions to perform any of the functions described herein. Any of the modules can also be implemented as a programmable logic device, application specific integrated circuit, electronic circuitry, or any combination of these implementations, to perform any of the functions described herein.

OTHER EMBODIMENTS

While this disclosure describes specific implementations, these should not be construed as limitations on the scope of the disclosure, but rather as descriptions of features in certain embodiments. Features that are described in the context of separate embodiments can also generally be implemented in combination in a single embodiment. Conversely, various features that are described in the context of a single embodiment can also be implemented in multiple embodiments separately or in any suitable sub-combination. Moreover, although features may be described above as present in certain combinations and even initially claimed as such, one or more features from a claimed combination can generally be excised from the combination, and the claimed combination may be directed to a sub-combination or variation of a sub-combination.

In addition to the embodiments expressly disclosed herein, it will be understood that various modifications to the embodiments described may be made without departing from the spirit and scope of the disclosure. Accordingly, other embodiments are within the scope of the following claims.

What is claimed is:

1. A cryptographic integrated circuit, comprising:
an input module configured to receive a stream of input data packets;
a plurality of cryptographic modules coupled to the input module, wherein each cryptographic module comprises an input port for receiving an input data packet and an output port for transmitting an output data packet, and is configured to encrypt or decrypt the received input data packet to generate an output data packet; and
an output module configured to receive output data packets from the plurality of cryptographic modules and to generate an output data stream comprising the output data packets,
wherein the input and output modules and the plurality of cryptographic modules are mounted on a single integrated circuit board; and
wherein the input module is configured to replace a header of each input data packet with an encryption header comprising a designation of one of the plurality of cryptographic modules to which the input data packet is distributed by the input module, and to distribute the input data packets among the plurality of cryptographic modules.

2. The circuit of claim 1, wherein the plurality of cryptographic modules comprises 2 or more cryptographic modules.

3. The circuit of claim 1, wherein the plurality of cryptographic modules comprises 4 or more cryptographic modules.

4. The circuit of claim 1, wherein each of the plurality of cryptographic modules is configured with an encryption key to encrypt or decrypt the received input data packet.

5. The circuit of claim 4, wherein each of the plurality of cryptographic modules is configured with a common encryption key.

6. The circuit of claim 4, wherein a first group of the plurality of cryptographic modules are configured with a first encryption key, and a second group of the plurality of cryptographic modules are configured with a second encryption key different from the first encryption key.

7. The circuit of claim 4, wherein each of the plurality of cryptographic modules is configured with a different encryption key.

8. The circuit of claim 1, wherein the output module is configured to replace an encryption header of each output data packet with an output header.

9. A cryptographic system, comprising:
the cryptographic integrated circuit of claim 1; and
an electronic processor coupled to the cryptographic integrated circuit,
wherein the electronic processor is configured to selectively activate or de-activate a subset of the plurality of cryptographic modules to encrypt or decrypt data packets of the stream of input data packets using activated cryptographic modules of the cryptographic integrated circuit.

10. The system of claim 9, wherein:
the system is connected to a power source of a space vehicle; and
the electronic processor is configured to measure an amount of power remaining in the power source, and to adjust the number of activated cryptographic modules used to encrypt or decrypt data packets of the stream of input data packets based on the amount of power remaining in the power source.

11. The system of claim 9, wherein:
the system is coupled to a power source of a space vehicle; and
the electronic processor is configured to measure a power consumption rate of the space vehicle, and to adjust the number of activated cryptographic modules used to encrypt or decrypt data packets of the stream of input data packets based on the power consumption rate.

12. The system of claim 9, wherein the electronic processor is configured to determine a bandwidth of the stream of input data packets, and to adjust the number of activated cryptographic modules used to encrypt or decrypt data packets of the stream of input data packets so that a data throughput rate of the cryptographic integrated circuit is at least as large as the bandwidth of the stream of input data packets.

13. The system of claim 12, wherein the electronic processor is configured to adjust the number of activated cryptographic modules used to encrypt or decrypt data packets of the stream of input data packets to a minimum number of activated cryptographic modules so that the data throughput rate of the cryptographic integrated circuit exceeds the bandwidth of the stream of input data packets.

14. The system of claim 9, further comprising a temperature sensor coupled to the electronic processor, wherein the electronic processor is configured to measure a temperature of the cryptographic integrated circuit, and to adjust the number of activated cryptographic modules so that the measured temperature does not exceed a threshold temperature value.

15. The system of claim 9, further comprising a plurality of temperature sensors, wherein each temperature sensor of the plurality of temperature sensors contacts one of the plurality of cryptographic modules, wherein the electronic processor is configured to measure a temperature of each cryptographic integrated circuit, and to de-activate cryptographic modules for which the measured temperature exceeds a threshold temperature value.

16. The system of claim 9, wherein at least one of the electronic processor and the input module is configured to de-activate cryptographic modules of the plurality of cryptographic modules that have failed.

17. The system of claim 9, wherein the electronic processor is configured to determine that a cryptographic module of the plurality of cryptographic modules has failed if the cryptographic module receives a input data packet and goes not generate an output data packet.

18. The system of claim 9, wherein the electronic processor is configured to measure an electrical property of a cryptographic module of the plurality of cryptographic modules, and to determine that the cryptographic module has failed if a value of the measured electrical property is outside an accepted range of values for the measured electrical property.

19. The system of claim 18, wherein the measured electrical property comprises a resistance or impedance of the cryptographic module.

20. The system of claim 18, wherein the measured electrical property comprises a voltage drop across the cryptographic module or a current through the cryptographic module.

21. The system of claim 9, wherein the input module is configured to distribute the input data packets among the plurality of cryptographic modules based on an availability of each of the plurality of cryptographic modules.

22. The system of claim 21, wherein each cryptographic module of the plurality of cryptographic modules is configured to transmit a signal to the input module to indicate an availability of the cryptographic module to receive an input data packet from the input module.

23. The system of claim 9, wherein the input module is configured to distribute the input data packets among the plurality of cryptographic modules based on a size of each input data packet.

24. The system of claim 23, wherein:
(a) the input module is configured to distribute a first plurality of f input data packets among f different cryptographic modules in a first order of the modules according to sizes of the f input data packets; and
(b) the input module is configured to distribute a second plurality of f input data packets among the f different cryptographic modules in a second order of the modules that is opposite to the first order of the modules.

25. The system of claim 24, wherein the input module is configured to repeat steps (a) and (b) with additional pluralities of f input data packets.

26. The system of claim 9, wherein the input module is configured to distribute the input data packets among the plurality of cryptographic modules based on an accumulated data processing load for each of the plurality of cryptographic modules.

27. The system of claim 26, wherein the input module is configured to distribute each successive input data packet to a cryptographic module among the plurality of cryptographic modules for which the accumulated data processing load is smallest.

28. The system of claim 9, wherein the input module is configured to distribute the input data packets among the plurality of cryptographic modules based on an encryption or decryption protocol associated with each input data packet.

29. The system of claim 28, wherein the input module is configured to distribute input data packets associated with a first encryption protocol to a first subset of the plurality of cryptographic modules, and to distribute input data packets associated with a second encryption protocol different from the first encryption protocol to a second subset of the plurality of cryptographic modules that is different from the first subset.

* * * * *